United States Patent [19]

Wong

[11] Patent Number: 4,836,527
[45] Date of Patent: Jun. 6, 1989

[54] SIDE EDGE REGISTRATION SYSTEM

[75] Inventor: Lam F. Wong, Walworth, N.Y.

[73] Assignee: Xerox Corporation, Stamford, Conn.

[21] Appl. No.: 182,699

[22] Filed: Apr. 18, 1988

[51] Int. Cl.[4] .............................................. B65H 9/16
[52] U.S. Cl. ................................... 271/251; 271/248; 271/252
[58] Field of Search ............... 271/251, 272, 248, 252, 271/250

[56] References Cited

U.S. PATENT DOCUMENTS

| 3,107,090 | 10/1963 | Templeton et al. | 271/251 |
|---|---|---|---|
| 3,148,877 | 9/1964 | Brearley | 271/251 |
| 3,175,824 | 3/1965 | Albosta | 271/251 |
| 4,505,471 | 3/1985 | Stockburger et al. | 271/251 |
| 4,621,801 | 1/1986 | Sanchez | 271/251 |

FOREIGN PATENT DOCUMENTS 61-2642 1/1986 Japan .

OTHER PUBLICATIONS

Anderson, G. D., "Paper Feed Aligner Mechanism"; IBM TDB; vol. 15; No. 4; Sep. 1972; p. 1253.
Beran, M. A.; "Backup Roller Mounting"; IBM TDB; vol. 22; No. 11; Apr. 1980; pp. 4833-4836.

Primary Examiner—Andres Kashnikow
Assistant Examiner—Matthew C. Graham

[57] ABSTRACT

Side registration of a moving sheet against a registration bar or abutment line may be accomplished by a roll nip that is slightly angled toward the registration line, and is thereafter self-pivotable from that angle to one angle nearly in alignment with the direction of sheet travel. The roll nip is spring urged toward the angled position, and moves toward the alignment position in response to the reaction force of the sheet when it engages the registration bar. More specifically, side registration and deskewing of a delicate or flimsy sheet is provided by driving the sheet sideways (transversely) against a side registration edge guide in the sheet path while the sheet is primarily being driven downstream by a roller drive system comprising a mating pair of rollers on opposite sides of the sheet path to form a non-slip nip engagement of the sheet. The rollers are not skewed relative to one another. They are both mounted on an elongated pivotal arm unit over the sheet path so that the nip positioned well downstream in the sheet path from the pivot axis of the arm unit by a much greater distance than the transverse distance from the pivot axis to the nip and angled to the arm to provide a high ratio of downstream sheet driving force versus the sideways force. The arm unit's free pivotal movement range is restricted to only about 15°. The arm unit is biased at an acute angle towards the edge guide but pivots within limits in response to driving a sheet in the nip.

9 Claims, 3 Drawing Sheets

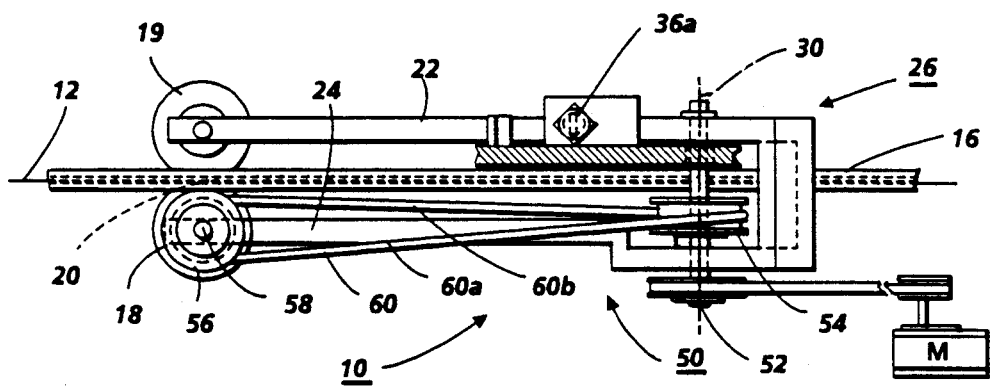
FIG. 3
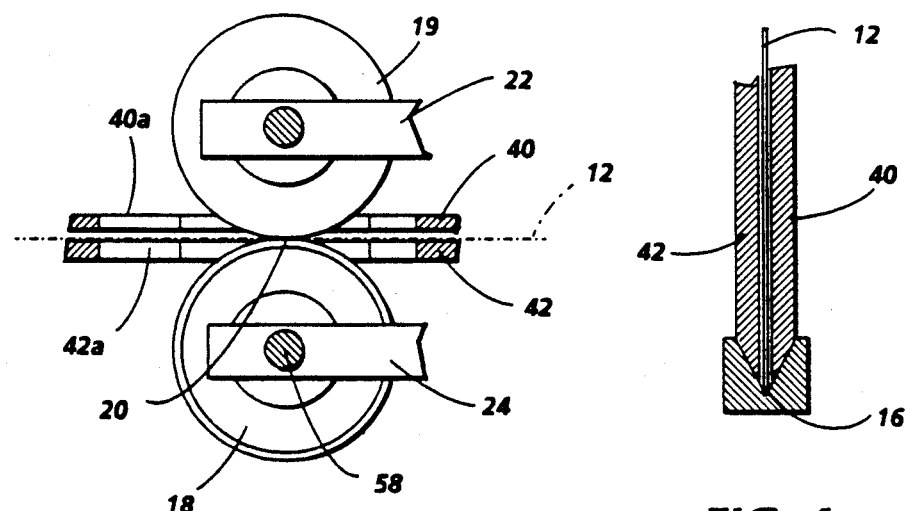
FIG. 5
FIG. 4
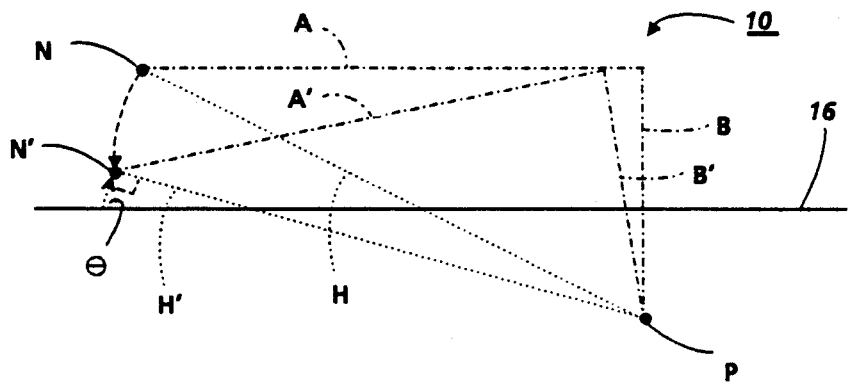
FIG. 6

SIDE EDGE REGISTRATION SYSTEM

Cross reference is made to a copending application by the same assignee, U.S.S.N. Pat. No. 171,262 filed Mar. 21, 1988, by Michael A. Malachowski, now U.S. Pat. No. 4,809,968. That system may be utilized together with this one, if desired.

The present invention relates to improved side registration of sheets of varying thickness, stiffness or weight, for example, in a copier or printer. Side or lateral edge registration alignment and deskewing may be accomplished without stopping the forward movement of the sheet. Active forward feeding assistance is provided.

The present invention provides improved side edge registration of sheets, with features of wide tolerances or latitude for different sheets, reduced wear, reduced image smearing, better regulated forces acting on the sheet, and other advantages.

In the system disclosed herein, side edge alignment of a sheet against a side edge alignment guide is effected using a non-skewed, noncrossed, driven feeding roller nip system on a pivotal arm unit placing the nip in a particular position relative to the pivot axis for providing improved side registration.

Other features of the system disclosed herein include a high ratio of forward driving force on the sheet relative to the side force exerted on the sheet, yet sufficient side force to positively register and deskew the sheet against a side registration edge or guide. A related feature is that the present system prevents sheet edge damage from uncontrolled side edge forces. A further related feature is that the side edge registration forces are automatically self-regulating. Furthermore, the side edge registration forces may be selected to directly compensate for, and adapt to, the specific coefficient of friction force vector between a sheet being side edge registered and the edge guide. In tests, embodiments of this system have been demonstrated to provide wide latitude in sheet handling, being able to handle sheets of various weights and thickness, and, especially, providing more dependable edge registration of heavyweight, high drag, paper sheets than conventional crossed-roller edge registration systems.

A further feature, with significant advantages over conventional crossed-roller edge registration systems, is a non-slip drive. The sheet being registered may be positively held without slippage between nipped rollers which are not skewed relative to one another. The rollers need not slip, either relative to one another, or relative to the sheet being registered, as is required in a crossed-rolled system. Not only does this reduce wear on the rollers, it also reduces the possibility of image smearing of pre-imaged sheets, e.g., typing ink. The disclosed system can also provide for more predictable paper arrival times, and reduced sheet stalling, both of which are important for registration systems, particularly where the registration system must also provide for sequential registration position and timing in a forward direction of sheet motion as well as the side registration provided herein. The coefficient of friction and normal force between the non-slip rollers here is less critical than for many of the side registration systems.

Another feature of this system shown herein is that although it automatically operates to automatically change the driving angle of the roller drive nip relative to the paper, no sensors or electrical controls are required, and a simple, low cost mechanism is provided. As shown in the exemplary embodiment disclosed herein, both mating rollers may be mounted and rotated on a single common dual arm pivotal member, which arm unit member pivots relative the sheet being registered, and relative to the side guide, to self-adjust the driving position and angle of the rollers, to automatically self-adjust and reduce lateral force on the sheet as the sheet encounters the edge guide.

A simple spring may be utilized to bias the sheet driving rollers toward the registration edge and provide control of the sheet driving force. A near over-center spring may be used, but is not required.

Another feature is that the present system may be utilized either with the sheet in a planar configuration, or while the sheet is curved, as in the sheet inverting path of a document handler.

An additional disclosed feature is a drive system which provides automatic driving force adjustment for changes in the feeding resistance of the sheet. Yet this automatic sheet driving force feedback system may be implemented by a simple and low cost belt drive. This automatic driving feedback system desirably cooperates with and forms part of the selfregulation of the side registration forces in the overall system.

The disclosed system is a non-slip and positively driven system, in which the rollers are acting to assist in the driving of the sheet in its forward, primary, direction of movement, rather than having any drag effect on the sheet.

By way of background, a registration system for original documents, in which nipped crossed-rollers with opposing skews are used for side registration into an edge guide in a document path is disclosed in U.S. Pat. No. 4,621,801 issued Nov. 11, 1986 to Hector J. Sanchez, incorporated by reference. Note especially column 17, lines 3-29. Relatively shewed cross-roll side edge registration is known in the art from said U.S. Pat. No. 4,621,801 and other references cited therein such as IBM U.S. Pat. No. 4,316,667 issued Feb. 23, 1982 to E. G. Edwards et al; U.S. Pat. No. 4,432,541 issued Feb. 21, 1984 to W. D. Clark et al; and U.S. Pat. No. 4,179,117 issued Dec. 18, 1979 to J. H. Rhodes, Jr.

However, such cross-rolled edge registration systems are quite critical as to the inherent delicate balancing of forces acting on the sheet, and the forces which the sheet can tolerate without loss of control of excess roll nip slippage, since the driving force system in the nip is normally designed to allow roller slippage in the direction of movement toward the registration edge after the copy sheet engages the registration edge without undesired or uncontrolled wrinkling or buckling of the sheet. That is especially difficult when lightweight sheets are being fed they require a low driving force to avoid these problems. On the other hand, when heavier weight or thicker sheets are being fed, a higher driving force may be required to overcome higher drag forces caused by sheet edge curl or other sheet feeding resistances.

Thus, there is a problem with cross-roll edge registration systems in particular, in that the high normal forces and drive forces needed to register heavy paper tend to overstress lightweight papers, which can even lead to sheet damage such as creasing, and or jamming of the sheets in the registration system, particularly if there is an additional problem of preexisting curl on the edge of the sheet.

In contrast to prior art cross-roll systems, in the present system there is produced a small self-controlled side force without the frictional slippage and wear of cross-rolls.

The following references disclose alignment rolls pivotable between angled and aligned positions, spring loaded toward the angled position, and moveable toward the aligned position in response to the reaction force of the sheet against the registration edge bar:

U.S. Pat. No. 3,148,877—Brearley
IBM T.D.B.—Vol. 15, No. 4
U.S. Pat. No. 3,175,824—Albosta
IBM T.D.B.—Vol. 22, No. 11
U.S. Pat. No. 4,505,471—Stockburger et al
61-2642—Japan.

Of these, the Japan reference may be of particular interest.

Other U.S. Patent references of background interest include: U.S. Pat. No. 4,266,762 Kramer et al; U.S. Pat. No. 4,483,530 Spencer et al; and U.S. Pat. No. 4,579,444 Pinckney et al.

It is important to note that in contrast to other conventional, systems for providing sheet edge registration by pivoting or rotation of a roller on an arm or finger, that in the disclosed system the axis of rotation of the rollers is not the axis of the arm. That is, the drive rollers rotate about an axis which is at a substantial angle to the axis of the arm on which the wheels are mounted. Furthermore, in the disclosed system, two rollers are acting on the opposite sides of the sheet being registered, and they are rotating in a common or parallel plane, perpendicular the sheet, rather than crossed or skewed relative to one another. That is, preferably the axies of the two rollers are parallel and horizontal and in a single common vertical plane.

As xerographic and other copiers increase in speed, and become more automatic, it is increasingly important to provide higher speed yet more reliable and more automatic handling, feeding and registration of both the copy sheets and the "originals" (the document sheets being copied). It is desirable to feed and accurately register sheets of a variety of mixture of sizes, types, weights, materials, conditions and susceptibility to damage, yet with minimal jamming, time delays, wear or damage by the sheet transporting and registration apparatus, even if the same sheets are automatically fed and registered repeatedly, as for recirculating document precollation copying.

The "document" here is the sheet (original or previous copy) being copied in the copier onto the "copy sheet", or "copy". In the decription herein the term "document" or "sheet" refers to a usually filmsy sheet of paper, plastic, or other such conventional individual image substrate, and not to microfilm or electronic images which are generally much easier and faster to manipulate and reorder. However, the copy sheet can be generated from electronic or other image data other than a document sheet.

The present invention, which is claimed in the apended claims, overcomes various of the above-discussed and other problems, and provides various of the above noted features and advantages.

A specific feature of the embodiment disclosed herein is to provide in a system for side registration and deskewing of a delicate or flimsy sheet being driven downstream in a sheet path in a primary direction of movement by a roller drive system, by driving the sheet sideways (transversely) against a side registration edge guide, the improvement wherein;

said roller drive system comprises a mating pair of rollers mounted on opposite sides of the sheet path to form a non-slip nip therebetween for non-slip engagement of the sheet;

said rollers not being skewed relative to one another;

said rollers being angularly mounted on an elongated pivotal arm unit extending over said sheet path;

said arm unit being pivotally mounted about a pivot axis;

said rollers being mounted out on said arm unit substantially spaced from said pivot axis;

positioning means for engaging said arm unit for positioning said arm unit so that said nip of said angularly mounted rollers is positioned substantially downstream in said sheet path from said pivot axis, and so that said nip is only at a small maximum angle to said side registration edge guide, to provide a high ratio of driving force in said primary direction to said sideways driving of the sheet;

said positioning means comprising limit means for limiting the range of free pivotal movement of said arm unit to a relatively small angle;

biasing means for biasing said arm unit towards said side registration edge guide with a controlled force;

and driving means for rotatably driving said rollers so that said arm unit can pivot appropriately in response to driving a sheet in said nip to automatically control said sideways driving of the sheet.

Further features provided by the system disclosed herein, individually or in combination, include those wherein a line between said nip and said pivot axis forms an acute angle with said registration edge guide in the downstream direction for all of said limited range of pivotal movement of said arm unit; wherein the position of said nip relative to said pivot axis is calculated from the vector reaction force angle from the coefficient of friction between the edge of a sheet and said side registration edge guide; wherein said nip is positioned on said arm such that the vector reaction force angle from the coefficient of friction between the edge of the sheet and said side registration edge guide intersects perpendicularly with a line drawn between said nip and said pivot axis; wherein said biasing means is a spring force acting on said arm unit which determines the initial sheet driving force in said nip; wherein said arm unit is freely pivotable between maximum and minimum said acute angle positions, with said minimum angle position being determined by said limit means; wherein said arm unit is biased by said biasing means toward said minimum angle position of said arm unit; wherein in said minimum angle position said nip is closer to said registration edge guide and said rollers are pivoted by the pivoting of said arm unit into a small skewed angle driving the sheet towards the said registration edge guide; wherein in said maximum angle position of said arm unit said rollers are substantially parallel to said side registration edge guide to drive the sheet substantially entirely in said primary, downstream, direction of movement; wherein the angular difference between said maximum and minimum angles, i.e. the maximum pivoting of said arm unit, is approximately 10 degrees or less; and/or wherein the distance said nip is positioned downstream of said pivot axis in said primary direction of movement of said sheet path is always substantially greater than the tranverse distance of said nip from said pivot axis or said registration edge guide.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below. The present invention will be better understood by reference to this description of this embodiment thereof, including the drawing figures (approximately to scale), wherein:

FIGS. 1 and 2 are substantially identical top views of one side registration and deskewing system example of the invention. FIG. 1 shows the system in a sheet feeding position after sheet side edge registration has occured. FIG. 2 shows the initial position as the sheet is entering the system; and the dashed line arrow on each Figure show the pivotal movement therebetween;

FIG. 3 is a side view of the exemplary system of FIGS. 1 and 2, to the same scale and proportions;

FIG. 4 is an enlarged cross-sectional view along the line 4—4 of FIG. 1, of the exemplary sheet side registration edge guide here (rotated into a vertical orientation for this view);

FIG. 5 is an enlarged side view along the line 5—5 of FIG. 1, of the exemplary deskewing roller system nip; and FIG. 6 is a schematic kinematic representation (geometric layout) of the system of FIGS. 1-5 to the scale and proportions of FIGS. 1-3.

Figure 1:
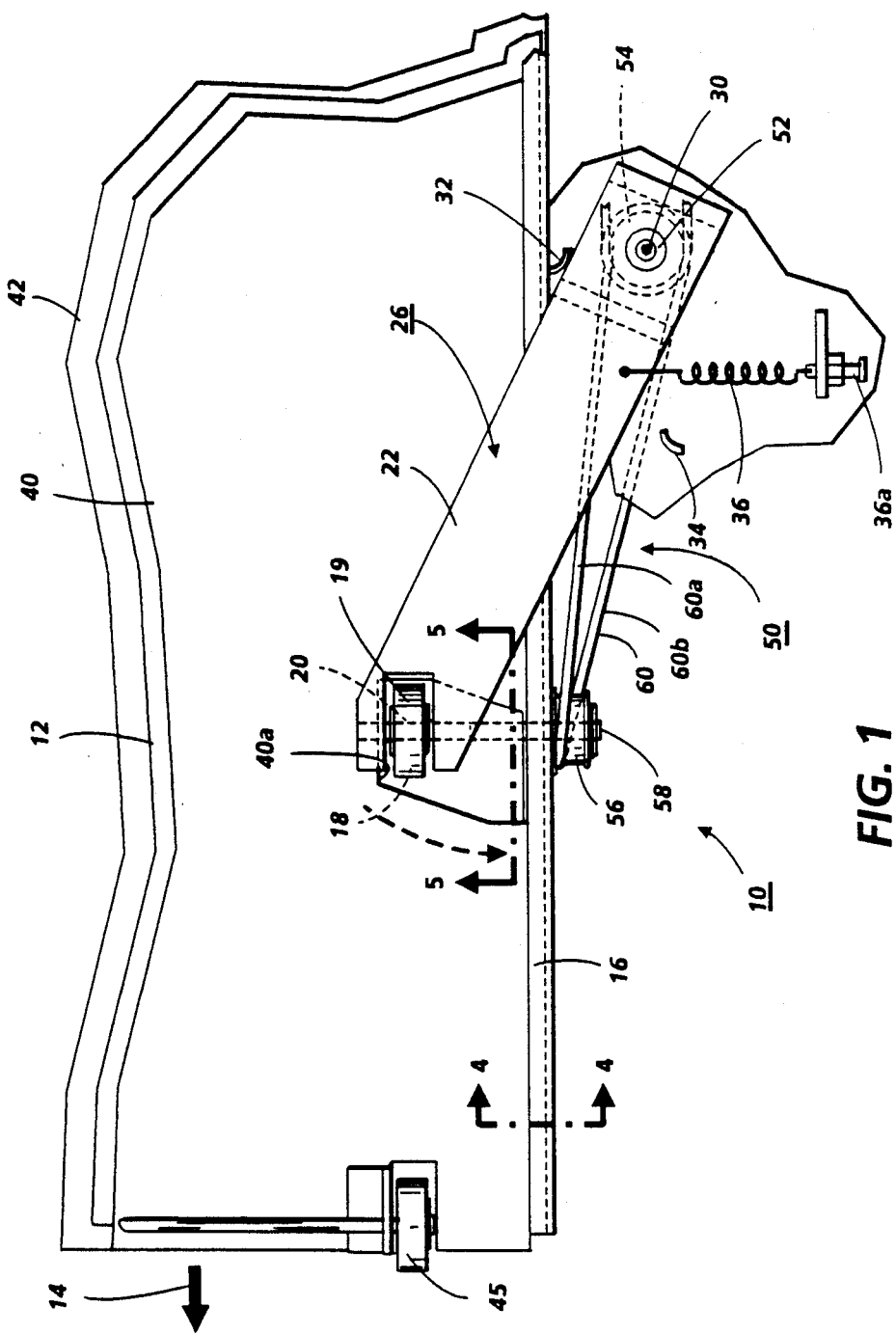

In this apparatus for side registering a sheet to a registration edge guide during forward movement of the sheet, the sheet is driven along a path with a forward direction of movement and a lateral direction of movement substantially normal to said forward direction, with the lateral movement of the sheet causing one side edge of the sheet to engage said registration edge guide so as to be aligned thereby. The means for moving the sheet comprises rollers providing a sheet engaging and driving nip between a driving roller and an idler roller adjacent the registration edge guide.

There is shown in FIGS. 1-6 an exemplary side registration and deskewing system 10. In this system 10 an incoming sheet 12 is positively driven in a primary, downstream, direction 14 indicated by the large movement arrows, but is also side registered and deskewed in the transverse direction against a side registration edge guide 16. (This one example is shown in cross-section in FIG. 4.)

The system 10 here is a roller drive system in which a driven drive or feed roller 18 mates with an idler roller 19 to form a non-slip sheet driving nip 20 identified as "N" and "N" in the kinematic layout of FIG. 6. (Note FIG. 5.) Both rollers 18 and 19 pivot together, by the same amount, and only with an arm unit 26 on which they are both mounted.

Figure 2:
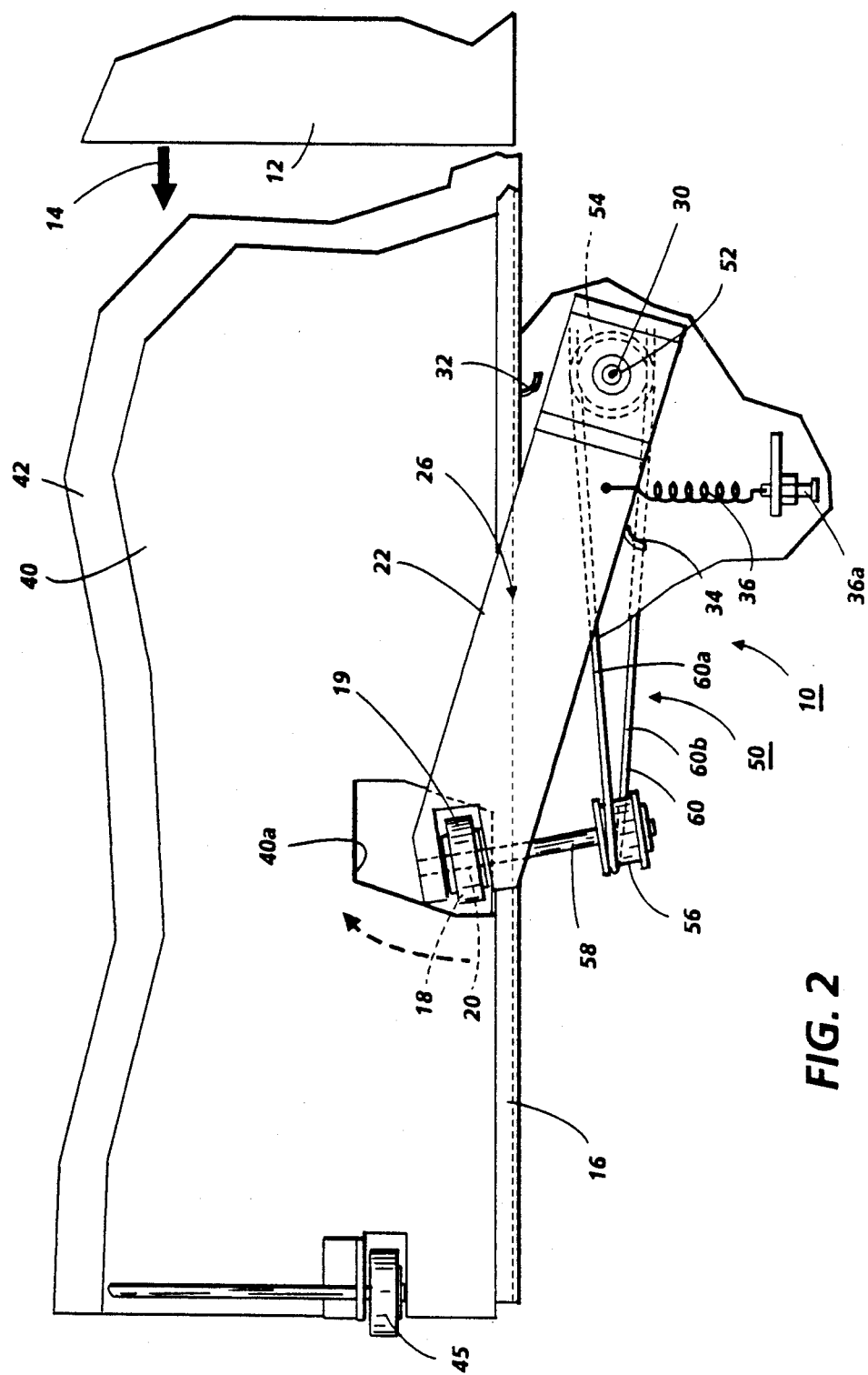

The arm unit 26 is freely pivotal between maximum and minimum position stops 32 and 34, i.e. between the limit positions shown FIG. 1 and FIG. 2, respectively (represented by the unprimed and primed indicia positions in FIG. 6). The only pivotal forces acting on the arm unit 26 when it is between these stops 32, 34 are: (1) the reaction force of the sheet 12 being driven in the nip 20; and (2) an adjustable bias force, provided here by a spring 36 adjusted with a screw adjustment 36a.

The rollers 18, 19 rotate in the same plane and on parallel axes. They are not skewed relative to one another. They are respectively rotatably mounted on an upper arm 22 and lower arm 24 of the integral pivotable arm unit 26. The arm unit 26 is rotatably mounted about a pivot axis 30 (identified as "P" in the kinematic of FIG. 6).

The sheet 12 is closely confined between upper and lower baffle plates 40 and 42 (see FIG. 4) except at small apertures 40a and 42a in the baffles provided only for the rollers 18 and 19 to extend therethrough to engage opposite sides of the sheet 12 over the pivotal range of movement of the nip 20 with the swing of the arm unit 26.

The edges of the battles 40, 42 are shown beveled in FIG. 4 to mate with the "V" shaped edge channel of the edge guide 16, but would not need to be, especially if thin gauge sheet metal is used. A known edge guide may be used with this system, which is preferably a "V" or "U" shaped channel or slot along one path edge.

After the sheet 12 has been side registered in this system 10, it may be fed downstream, as in FIG. 1, to take-away rollers 45. These may comprise a lead edge sheet registration system in the forward direction, if desired.

The drive system 50 for the system 10 components comprises a motor "M" (see FIG. 3) driving a shaft 52 at the pivot axis 30, on which there is a horizontal pulley 54, which in turn drives a vertical pulley 56 on the shaft 58 of the drive roller 18 through a belt 60. The interconnecting drive belts may be conventional elastomer "O" rings.

The 90° difference in orientation between pulley 54 and pulley 56 causes a substantial horizontal displacement between the pulling or driving side 60a of belt 60 and the slack or return flight 60b of that belt 60. This resulting movement about pivot P creates a moment arm force which is proportional to the nip reation force from the sheet feed resistance.

The sequence of operation may be decribed as follows:

1. The paper sheet enters the system nip with an initial incoming skew and offset.
2. The sheet is driven forward, and also sideways towards the edge guide, in the same direction as the initial nip angle.
3. Upon sheet corner contact with the edge guide, the reaction force generated at the sheet corner will cause the sheet to rotate gradually between the nip towards full sheet edge contact. Normally the spring bias will maintain the arm unit in position against the lower limit stop thereby maintaining the initial nip angle.
4. As soon as the edge of the paper is in full contact with the edge guide, a side force will develop between them and be transmitted through the nip to arm unit.
5. The bias spring force is then overcome by this side force and it causes the arm to pivot away from the lower limit stop.
6. The paper continues to be driven forward and biased towards the side guide by the nip while the arm pivots sufficiently to maintain a force balance between the spring bias and the side force generated in the variably angled nip.
7. Depending on the initial offset of the paper, and the sheet drag, the arm may or may not pivot out to the outer limit stop before the paper leaves the nip.
8. Upon paper leaving the nip, the arm unit will swing back to the initial limit stop location, under the influence of the spring bias, into position to start a new cycle.

The present system can operate effectively with a preferred range of side forces from virtually 0 to approximately 1 newton (approximately ¼ pound). If desired, this side force can be reduced even further after deskew, i.e. after the sheet is fully abutted against the edge guide and the rollers have been self-driven out away from the initial sheet registration position of FIG. 2 to the FIG. 1 position in which they are approximately parallel to the side guide and in the main direction of sheet movement. This can be accomplished by a near over-center spring, which will shift to the other side of the pivot axis in the FIG. 1 position by having a different end mounting position.

In contrast to said low side force, the downstream driving force can be many times higher with the present system. In fact, the downstream driving force basically is only limited by the torque provided by the driven roller drive system or by the slip limit between the drive roller and the sheet. However, by using a high coefficient of friction polyurethane drive roller and a sufficiently high normal force, slip will not occur under normal conditions even for a high drag sheet. Furthermore, because the two rollers are not crossed relative to one another, a relatively high normal force can be put between the idler roller and the driven roller to firmly hold the sheet against the driven roller without a wear problem. This normal force may be easily adjustable simply by increasing the pressure of the idler roller down against the driven roller from its arm, or by tensioning the two support arms towards one another by springs, screw adjustments, or the like. Yet in spite of this high forward driving force, this system provides gentle side registration forces pushing the edge of the sheet into the edge guide only with sufficient force for edge registration irrespective of the initial condition of the sheet.

An important feature of this system is that the roller nip is always downstream of the pivot axis of the arm unit, i.e. the arms carrying the rollers forming the nips. To express it another way, as shown in FIG. 6, the nip N, N' is positioned, and operates, by a distance A, A' downstream in the direction of normal sheet movement which is much greater than the distance B, B' transverse the primary sheet movement direction and transverse the side guide 16. In FIG. 6, a right triangle is formed with sides A and B and hypotenuse H, where H is the line between nip N and pivot axis P. (The corresponding prime locations thereof are the deskewing position of FIG. 2.) As illustrated, the dimension A is substantially greater than the dimension B. These structural and positional distinctions are very significant in the providing with the present system of a ratio of the downstream driving force to lateral or side force which is always greater than one. By making the dimension A always much longer than B, the ratio of forward drive force to side force in the nip N is greatly improved. The preferred ratio of A to B is about 2. The maximum ratio is from about 2 to 4. The minimum is not substantially less than 2.

In most of the prior art systems there is no "A" dimension at all, i.e. both the roller axis and its arm rotate about a common pivot axis. The rollers are normally extending perpendicular from the pivot axis out over the paper, i.e. at the end of line "B".

Note that it is the relative position of the nip N' relative to the pivot point P, not relative to the side guide, that is key here. (Providing the nip is sufficiently close to the side guide to discourage buckling of the sheet by not providing too great a sheet distance therebetween.)

As indicated, an important feature of this system is that the distance A by which the arm unit mounting the drive wheels extends downstream of its pivot axis is always substantially greater than the transverse distance B by which the arm extends out over the sheet from the pivot axis thereof, i.e. that this ratio downstream distance and transverse distance is always greater than one. In previous systems this ratio was less than one.

Although there is illustrated here a conventional, basically linear, edge guide 16, this system is fully compatible with, and can be effectively utilized with, an edge guide providing either a general or localized arcuate deformation or both for increased beam stiffness as respectively illustrated in said Sanchez U.S. Pat. No. 4,621,801 cited herein or in the above-cited copending application by Michael A. Malachowski, Ser. No. 171,762.

Another feature preferably provided herein is that the dimensions of the pivot arm and the roller nip location thereon relative to the pivot axis of the arm not only conform to the above described ratios but may be even more precisely determined and calculated as follows. The illustrated sheet side edge drag reaction vector may be calculated from a coefficient of friction of a sheet relative to a side edge guide. That calculated vector angle $\theta$ may be utilized to determine the desired position of the nip and therefore the desired length and position of the arm. Preferably, the line H' between the nip N' and the pivot axis P is made perpendicular and interacting at N' to said side edge drag reaction vector line. (The dashed arrowhead line defining $\theta$ in FIG. 6) That is, the side force vector of the nip N' may be made identical to the side edge drag reaction vector.

$\theta$ may be calculated as follows:

$$\theta = 90° - \tan^{-1}(\mu_e)$$

Where $\mu_e$=coefficient of friction between the sheet edge and the edge guide.

It will be noted that the disclosed system is provided with stops or limits 32, 34, limiting the maximum and minimum pivotal angles of the pivot arm. The maximum position is one in which the rollers are substantially parallel to the side edge so that they are driving the sheet only in the downstream direction, as in FIG. 1. This may be achieved automatically after sheet side registration.

However, it is important to also not the special case in which before there is any contact of a sheet with the side edge guide, the forward drag force of the sheet exceeds the maximum drive force which the driving nip of this system can provide under that situation. In that special case the arm unit could pivot out to its maximum position, and keep driving the sheet in the forward direction without stalling, but not drive the sheet sideways. Thus, in that special case, there will not be side registration of the sheet. However, there will be no slip, jam or loss of forward registration of the sheet.

Note that in the situation where no part of the sheet has yet contacted the edge guide, and the arm unit is not at a limit stop, that in this system the drive force is equal to the drag force, and the maximum drive force is equal to:

$$M/B'$$

where M is the bias force moment acting on the pivot arm provided by the spring 36 and its mounting position relative to the pivot axis, and B' is the transverse arm dimension between the pivot axis and the nip as shown in FIG. 6. Since M is due entirely to the applied spring force in this situation, the drive force is correspondingly limited by the amount of spring force. That situation ends when the arm unit is pivotally driven out to its maximum angle stop 32, in which case the drive force can greatly increase, up to the slip level of the drive system.

Note that it is not desirable to have an excessive arm biasing spring force, because once any part of the sheet has contacted the side edge, there is a different situation. In that situation, i.e. during and after edge registration and deskewing, there is a side force equal to:

$$M/H'$$

Where H' is the arm hypotenuse between the nip and the arm unit axis, as shown in FIG. 6

Preferably the vector angle $\theta$ which is determined by the coefficient of friction reaction vector determines the hypotenuse H' and its angle, i.e. the angle between the line H' between the arm pivot point P and the nip N' and the sheet path or side guide. There in only one such "H" angular position that can make a 90° angle with said reaction force vector line angle $\theta$. Since the reaction force vector angle $\theta$ is normally at a relatively high angle relative to the side axis, systems designed in accordance with this novel criteria herein will always have effective operating arm line A' which is forming an acute, relatively small, angle relative to the line or axis of the side guide, preferably approximately 5 degrees at the initial position A'. An example of a suitable dimension for typical paper and drag conditions is an angle between A' and the side guide of 15 degrees maximum and 5 degrees minimum (depending on the initial offset of incoming paper). This corresponds to an initial angle of "B'" from perpendicular the sheet path and edge guide of 5° also. The initial skew angle of the nip at N' is also preferably approximately 5 degrees since the nip here is aligned with A and A', and A and A' are by definition at right angles to B and B', respectively.

The driving force to side force ratio "R" of the system may be calculated with the following formula:

$$R = \frac{1}{\cos\{90° - \tan^{-1}(\mu_e - \theta_o)\}}$$

where $\mu_e$ is the coefficient of friction between the edge of the sheet and side guide and $\theta_o$ is the initial skewed angle formed between A' and the side guide axis.

Although not critical, an example of a suitable material for the idler roller 19 is Lexan plastic or steel with a smooth cylindrical outer surface. The driven roller 18, here the lower roller, may desirably be a rounded or crowned-edge polyurethane rimmed wheel, for example.

In the disclosed system both rollers are on single, two part, arm unit and commonly pivot about a common vertical pivot axis which is perpendicular the sheet. This arm preferably has a relatively low mass, but that is only critical for high speed operations.

As noted above, it has been found that an unusually high drag (frictional) resistance of the paper being driven into the system can create a similar reaction force on the driving nip to that of the normal condition after the sheet has engaged the registration edge. That is, the system can be partially "fooled" into thinking that deskewing has been accomplished before it actually has been in such a high drag situation.

There is an additional feature provided in the drive system 50 here which assists the overall system of side registration operation to overcome this problem. When a high drag sheet is experienced by the system, the tensioned or pulling side 60a of the O ring belt 60 is positioned to extert a correspondingly increased moment arm force tending to help hold the arm in. That is, to help maintain the initial skewed angle of the rollers and nip relative to the edge guide, and to help keep the arm unit from rotating out until actual deskewing has been accomplished. This is accomplished by a drive system in which the pulling flight 60a of the belt is angled outside of the return flight 60b and spaced at a distance from the pivot axis P, thereby exerting a moment on the arm unit tending to rotate the arm unit toward the side registration edge with a force proportional to the driving force which that belt flight 60a is exerting, which is substantially equal to the reaction force on the drive roller 18. This horizontal spread between the belt flights 60a and 60b is accomplished here by the fact that the driven pulley 54 for the this belt 60 is horizontal. This horizontal cross pulley 54 accomplishes the spreading or angling of the tension side 60a of the drive belt 60 from the opposite or slack side 60b (the return flight) of the belt. By changing the diameter of the horizontal driving pulley 54, or its position, the belt angle can be increased or decreased to increase or decrease the moment force on the arm unit acting toward the side guide, which correspondingly increases the side edge registration force on the sheet in direct proportion to the drag resistance (driving) reaction force on the nip.

If an additional such roller system or unit 10, or a conventional cross roll, is provided upstream from the nip by less than the sheet dimension in the feeding direction, so that both nips can act on the sheet simultaneously for part of the sheet movement, as disclosed in the abovecited copending incorporated Michael A. Malachowski U.S. Pat. No. 4,809,906, then a greater initial sheet misregistration can be corrected. This upstream nip may also be spaced further away from the side registration edge, to capture more grossly misregistered sheets entering the system, i.e. sheets whose edges are initially further away from the registration edge.

Preferably the upstream feed path is such that if there is any initial skew of the sheet it is a skew such that the rear or upstream corner edge of the sheet will hit the side edge guide before the front corner of the sheet does. This avoids buckling or jamming tendencies which can be caused by the front corner of the sheet snubbing against the side registration edge. This path orientation can be provided in a known manner, such as by using a slightly larger diameter for the inside feed roll versus the outside rollers of conventional common shaft feed rollers upstream of the registration system, or by appropriate acceleration of the sheet being fed into the registration system.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a system for side registration and deskewing of a delicate or flimsy sheet being driven downstream in a sheet path in a primary direction of movement by a roller drive system, by driving the sheet sideways (transversely) against a side registration edge guide, the improvement wherein;

said roller drive system comprises a mating pair of rollers mounted on opposite sides of the sheet path to form a non-slip nip therebetween for non-slip engagement of the sheet;

said rollers not being skewed relative to one another;

said rollers being angularly mounted on an elongated pivotal arm unit extending over said sheet path;

said arm unit being pivotally mounted about a pivot axis;

said rollers being mounted out on said arm unit substantially spaced from said pivot axis;

positioning means for engaging said arm unit for positioning said arm unit so that said nip of said angularly mounted rollers is positioned substantially downstream in said sheet path from said pivot axis, and so that said nip is only at a small maximum angle to said side registration edge guide, to provide a high ratio of driving force in said primary direction to said sideways driving of the sheet;

said positioning means comprising limit means for limiting the range of free pivotal movement of said arm unit to a relatively small angle;

biasing means for biasing said arm unit towards said side registration edge guide with a controlled force;

and driving means for rotatably driving said rollers so that said arm unit can pivot appropriately in response to driving a sheet in said nip to automatically control said sideways driving of the sheet;

wherein said arm unit is freely pivotable in a preset maximum pivotal range limited to approximately 15 degrees, said limited range being defined by said limit means being positioned to impede pivoting of said arm unit outside of said limited range.

2. In a system for side registration and deskewing of a delicate or flimsy sheet being driven downstream in a sheet path in a primary direction of movement by a roller drive system, by driving the sheet sideways (transversely) against a side registration edge guide, the improvement wherein;

said roller drive system comprises a mating pair of rollers mounted on opposite sides of the sheet path to form a non-slip nip therebetween for non-slip engagement of the sheet;

said rollers not being skewed relative to one another;

said rollers being angularly mounted on an elongated pivotal arm unit extending over said sheet path;

said arm unit being pivotally mounted about a pivot axis;

said rollers being mounted out on said arm unit substantially spaced from said pivot axis;

positioning means for engaging said arm unit for positioning said arm unit so that said nip of said angularly mounted rollers is positioned substantially downstream in said sheet path from said pivot axis, and so that said nip is only at a small maximum angle to said side registration edge guide, to provide a high ratio of driving force in said primary direction to said sideways driving of the sheet;

said positioning means comprising limit means for limiting the range of free pivotal movement of said arm unit to a relatively small angle;

biasing means for biasing said arm unit towards said side registration edge guide with a controlled force;

and driving means for rotatably driving said rollers so that said arm unit can pivot appropriatley in response to driving a sheet in said nip to automatically control said sideways driving of the sheet;

wherein a line between said nip and said pivot axis forms an acute angle with said registration edge guide in the downstream direction for all of said limited range of pivotal movement of said arm unit.

3. The system for side registration of claim 2 wherein the position of said nip relative to said pivot axis is calculated from the vector reaction force angle from the coefficient of friction between the edge of a sheet and said side registration edge guide.

4. The system for side registration of claim 3 wherein said nip is positioned on said arm such that the vector reaction force angle from the coefficient of friction between the edge of the sheet and said side registration edge guide intersects perpendicularly with a line drawn between said nip and said pivot axis.

5. The system for side registration of claim 1 wherein said biasing means is a spring force acting on said arm unit which determines the initial sheet driving force in said nip.

6. The system for side registration of claim 2 wherein said arm unit is freely pivotable between maximum and minimum said acute angle positions, with said minimum angle position being determined by said limit means; wherein said arm unit is biased by said biasing means toward said minimum angle position of said arm unit; wherein in said minimum angle position said nip is closer to said registration edge guide and said rollers are pivoted by the pivoting of said arm unit into a small skewed angle driving the sheet towards the said registration edge guide; and wherein in said maximum angle position of said arm unit said rollers are substantially parallel to said side registration edge guide to drive the sheet substantially entirely in said primary, downstream, direction of movement.

7. The system for side registration of claim 6 wherein the angular difference between said maximum and minimum angles is approximately 15 degrees or less.

8. The system for side registration of claim 2 wherein a line between said nip and said pivot axis forms an acute maximum and minimum angle with said registration edge guide in the downstream direction for all of said limited range of pivotal movement of said arm unit; wherein said arm unit is biased by said biasing means toward said minimum angle position of said arm unit; wherein in said minimum angle position said nip is closer to said registration edge guide and said rollers are pivoted by the pivoting of said arm unit into a small skewed angle driving the sheet towards the said registration edge guide; and wherein in said maximum angle position of said arm unit said rollers are substantially parallel to said side registration edge guide to drive the sheet substantially entirely in said primary, downstream, direction of movement; wherein said biasing means in a spring force acting on said arm unit which determines the initial sheet driving force; and wherein the distance said nip is positioned downstream of said pivot axis in said primary direction of movement of said sheet path is always substantially greater than the tranverse distance of said nip from said pivot axis or said registration edge guide.

9. In a system for side registration and deskewing of a delicate or flimsy sheet being driven downstream in a sheet path in a primary direction of movement by a roller drive system, by driving the sheet sideways (transversely) against a side registration edge guide, the improvement wherein;
- said roller drive system comprises a mating pair of rollers mounted on opposite sides of the sheet path to form a non-slip nip therebetween for non-slip engagement of the sheet;
- said rollers not being skewed relative to one another;
- said rollers being angularly mounted on an elongated pivotal arm unit extending over said sheet path;
- said arm unit being pivotally mounted about a pivot axis;
- said rollers being mounted out on said arm unit substantially spaced from said pivot axis;
- positioning means for engaging said arm unit for positioning said arm unit so that said nip of said angularly mounted rollers is positioned substantially downstream in said sheet path from said pivot axis, and so that said nip is only at a small maximum angle to said side registration edge guide, to provide a high ratio of driving force in said primary direction to said sideways driving of the sheet;
- said positioning means comprising limit means for limiting the range of free pivotal movement of said arm unit to a relatively small angle;
- biasing means for biasing said arm unit towards said side registration edge guide with a controlled force;
- and driving means for rotatably driving said rollers so that said arm unit can pivot appropriately in response to driving a sheet in said nip to automatically control said sideways driving of the sheet;
- wherein the distance said nip is positioned downstream of said pivot axis in said primary direction of movement of said sheet path is always substantially greater than the tranverse distance of said nip from said pivot axis.

* * * * *